United States Patent
Klinksiek

Patent Number: 6,085,644
Date of Patent: Jul. 11, 2000

[54] PROCESS AND DEVICE FOR HOMOGENIZING MILK

[75] Inventor: Bernd Klinksiek, Bergisch Gladbach, Germany

[73] Assignee: Bayer Aktiengesellschaft, Leverkusen, Germany

[21] Appl. No.: 09/296,850

[22] Filed: Apr. 22, 1999

Related U.S. Application Data

[62] Division of application No. 09/005,621, Jan. 9, 1998, Pat. No. 5,958,495.

[30] Foreign Application Priority Data

Jan. 13, 1997 [DE] Germany .......................... 197 00 810

[51] Int. Cl.⁷ .................................. A01J 1/00; A23P 1/00
[52] U.S. Cl. ................................................ 99/452; 99/452
[58] Field of Search ........................... 99/452–455, 275, 99/293, 523.1; 426/36, 519, 582, 474, 511; 366/176, 337, 340, 138

[56] References Cited

U.S. PATENT DOCUMENTS

| | | |
|---|---|---|
| 2,132,584 | 10/1938 | Speller . |
| 4,430,251 | 2/1984 | Patterson, et al. . |
| 4,585,357 | 4/1986 | Ogata ........................................ 366/176 |
| 4,922,810 | 5/1990 | Siccardi ................................ 99/452 X |
| 4,952,067 | 8/1990 | Dallas ...................................... 366/337 |
| 4,979,441 | 12/1990 | Welch et al. ................................ 99/453 |
| 5,116,536 | 5/1992 | Bücheler, et al. . |
| 5,409,672 | 4/1995 | Cetinkaya . |
| 5,723,518 | 3/1998 | Kahl, et al. . |

FOREIGN PATENT DOCUMENTS

| | | |
|---|---|---|
| 0 034 675 A2 | 9/1981 | European Pat. Off. . |
| 0 101 007 A2 | 2/1984 | European Pat. Off. . |
| 40 37 665 A1 | 6/1992 | Germany . |
| 195 10 651 A1 | 12/1995 | Germany . |
| 350716 | 6/1931 | United Kingdom . |
| 9535034 | 12/1995 | WIPO . |

OTHER PUBLICATIONS

H. Eibel, "Untersuchung zur Hochdruckhomogenisation von Sahne mit verschiedenen Fettgehaltsstufen", Fortschr.–Ber. VDI series 3 No. 136, Düsseldorf, VDI–Verlag 1987.

Walstra, P., Formation of Emulsions in: Becher, P; Encyclopedia of Emulsion Technology, vol. 1, New York, Basle: Dekker, 1983.

Abstract of WO 83/01210, dated 1981.

Abstract of US 1,042,171, published 10-22-1912.

*Primary Examiner*—Timothy Simone
*Attorney, Agent, or Firm*—Norris, McLaughlin & Marcus, P.A.

[57] ABSTRACT

The invention relates to a device and a gentle process for homogenizing fatty liquid natural products, particularly for homogenizing milk or cream products, e.g. cow's milk, sheep's milk or goat's milk, with a fat content of up to 50 wt. %.

5 Claims, 3 Drawing Sheets

PROCESS AND DEVICE FOR HOMOGENIZING MILK

This application is division of Ser. No. 09/005,621, filed Jan. 9, 1998, now U.S. Pat. No. 5,958,495.

BACKGROUND OF THE INVENTION

The invention relates to a device and a gentle process for homogenizing fatty liquid natural products, particularly for homogenizing milk or cream products, such as cow's milk, sheep's milk or goat's milk, with a fat content of up to 50 wt. %.

SUMMARY OF THE INVENTION

The homogenizing of cow's milk is described in numerous publications and dissertations. The work of H Eibel, "Untersuchung zur Hochdruckhomogenisation von Sahne mit verschiedenen Fettgehaltsstufen", Fortschr.-Ber. VDI series 3 No. 136, Düsseldorf, VDI-Verlag 1987, gives a comprehensive survey of the prior art in this field.

Very generally speaking, various homogenization processes which are selected according to the technical field of application are used in homogenization technology for water/oil or oil/water emulsions.

A two-stage process for producing pharmaceutical oil-in-water emulsions is known from published patent specification EP 101007 A2 in which a pre-dispersed preliminary emulsion of oil and water is finely dispersed in a dispersion nozzle at a pressure of 2 up to 50 bars with phase inversion.

The selection and a comparison of suitable dispersing machines for producing dispersions is described in numerous publications such as that by Walstra, P., Formation of Emulsions in: Becher, P: Encyclopedia of Emulsion Technology, Vol. 1, New York, Basle: Dekker, 1983.

Similarly it is described that dispersing machines are selected according to the extent of the volume-related output. Dispersing machines with high volume-related outputs, such as high pressure homogenizers, are required to produce finely divided emulsions smaller than 1 μm. Emulsions as finely divided as this cannot be produced with rotor/stator machines.

The above-mentioned VDI report by H Eibel describes, inter alia, that when homogenizing milk, particularly cow's milk, the phase interface between fat and water must be increased by the factor 3–10 and the average particle diameter of the fat particles correspondingly reduced to a particle size of less than 1 μm, for reasons of storage stability. As milk is a natural product and is not therefore standardized like technical emulsions, to reduce the fat particles a homogenizing device is required which carries out this process step in a particularly gentle way but is insensitive to variations in composition at the same time.

The interface increased by the homogenization must then be stabilized again by means of the emulsifier membrane which consists of a mixture of phospholipids and proteins in the case of milk. In the literature the desired membrane thickness is described with a thickness of approx. 10 nm and a load of 10 mg/m².

The homogenization of cream products with high fat phase contents presents special problems because of the varying mass ratios of fat and emulsifier.

To solve these problems, the above-mentioned VDI report by H Eibel proposes to homogenize milk or particularly cream with a different fat content in a high pressure homogenizer which is operated in its initial stage with a pressure of over 100 bars. Milk products and related products are therefore conventionally homogenized with high pressure homogenizers.

A further problem arises from the concentration process in dairies which involves a processing of increasingly large quantities of milk. The required milk throughput which is to be processed by a single high pressure homogenizer has further increased notably with the passage of time. If one considers the valve of a known high pressure homogenizer, the aperture width of the homogenizer valve increases with increasing throughput. With the same homogenizing pressure, only coarser emulsions with a large fat particle diameter then result because of the higher aperture width of the high pressure homogenizer. A higher working pressure is therefore required in order to achieve the same particle size as with high pressure homogenizers with lower throughput.

Published patent specification EP 34675 A2 finds a solution in the parallel connection of several valves in one high pressure homogenizer.

As the valve apertures of the high pressure homogenizer are then smaller, the high pressure homogenizer can also be operated at somewhat lower pressure which corresponds to the pressure which is used with high pressure homogenizers with average throughput.

The object of the invention is to provide a homogenizing process which does not have the disadvantages of the known processes and which operates in particular for economical homogenization with the lowest possible homogenizing pressure and high throughput and/or volume flow at the same time.

According to the invention the object is achieved by a process for homogenizing fatty liquid aqueous natural products, particularly for homogenizing milk or cream products, particularly cow's milk, sheep's milk or goat's milk, with a fat content of up to 50 wt. % and more, which is characterized in that the liquid is driven at a pressure of 10 to 100 bars, preferably 20 to 80 bars and a throughput of up to 100 m³/hr and more through a single or multi-stage nozzle dispersing device, wherein the device has a plurality n of nozzle bores, wherein n is in particular 50 or more, preferably 100 or more, and the throughflow rate in the region of each nozzle bore is 10 to 200 m/s.

DETAIL DESCRIPTION

In a variant of the process according to the invention the liquid to be homogenized is driven through nozzle bores which are formed in such a way that the product of the hydraulic cross-sectional area Fh of the nozzle bore and its length L satisfies the equation $$F_h * L = d^3$$

in which d is the hydraulic diameter of the nozzle bore.

To prevent coalescence and aggregation of fat particles in the liquid, two- or multi-stage nozzle dispersing devices are preferably used in the process according to the invention, wherein the distribution of the pressure gradient is optimized to the particular stages in question according to need.

A two-fold and multiple homogenization of the liquid to be homogenized with a relief between the homogenization steps is optionally also possible as a variant. Preferred narrow particle size distributions are achieved by multiple homo-genization. Storage-stable milk products with the coarsest possible average particle size and narrow distribution are desirable in the case of milk products. Accordingly the invention is based on the further-reaching idea that narrower particle size distributions of milk or milk products may be achieved by connecting a further nozzle disperser or several nozzle dispersers in series. By means of the particular number of bores of the nozzle dispersers the pressure drop in each dispersion stage may be set to be identical or also different. An optimal adaptation to the interfacial coating kinetics of the emulsifier membrane for the stabilization of the fat droplets may be achieved in particular by this means. The coalescence and aggregation of the fat particles is avoided.

In the preferred process the temperature increase of the fatty liquid is 3° C. maximum, particularly 1.5° C. maximum. The processing temperature should preferably be 55 to 80° C., particularly 60 to 70° C.

The precise optimum processing temperature is determined according to the fat content of the liquid.

It proves to be particularly advantageous if the process is configured, by selection of the operating conditions of the nozzle disperser, e.g. by corresponding setting of the differential pressure between the chamber in front of the nozzle openings and behind the nozzle openings and/or selection of the length of the nozzle opening and its hydraulic diameter, in such a way that the volume-related energy density which is introduced into the liquid in the region of the nozzle openings is from $10^6$ to $10^8$ J/m$^3$, preferably from $5 \cdot 10^6$ to $10^7$ J/m$^3$. With milk in particular, noticeable changes in taste occur above $10^8$ J/m$^3$ because of thermally induced decomposition, whilst in certain circumstances unstable emulsions or inadequate homogenization result below $10^6$ J/m$^3$.

Up to 90% of the particles of the homogenized fatty liquid preferably obtainable with the process have a volume-related particle diameter in the range from 0.1 to 1 µm, particularly from 0.3 to 1 µm.

The invention also provides a single or multi-stage nozzle dispersing device for homogenizing fatty liquid natural products or foodstuffs, particularly for homogenizing milk or cream products, particularly cow's milk, sheep's milk or goat's milk, with a fat content of up to 50 wt. % and more, consisting of a conveying unit for conveying the liquid to be homogenized, a preliminary pressure chamber, one or more low pressure chambers connected in series and a plurality of dispersing openings via which the preliminary pressure chamber and the low pressure chambers are connected together, wherein the conveying unit generates a defined preliminary pressure in the preliminary pressure chamber, characterized in that the nozzle bores of the dispersing openings have a hydraulic diameter of 0.1 to 1 mm, preferably 0.2 to 0.7 mm and are formed in such a way that the product of the hydraulic cross-sectional area $F_h$ of the nozzle bores and their length L satisfies the equation $$F_h * L = d^3$$

in which d is the hydraulic diameter of the nozzle bores.

In particular the nozzle bores have a hydraulic diameter of 0.1 to 1 mm, preferably 0.2 to 0.7 mm. The nozzle bores may have any shape of cross-sectional areas, i.e. rectangular, square or round cross-sectional areas, for example.

The stages of the dispersing device are at least formed by the preliminary pressure chamber and a low pressure chamber or by two adjacent low pressure chambers and the dispersing openings connecting these chambers.

The total cross-sectional area of all nozzle bores in a stage is at least 10 mm$^2$ in particular. This makes it possible to achieve a quantity throughput of homogenized fatty liquid of up to 100 m$^3$/hr and more.

In a stage there is in particular a number n of 50 or more, preferably 100 or more, particularly preferably 150 or more of nozzle bores distributed over the chamber wall. These are preferably combined in one or more nozzle bodies 5.

With the aid of the special nozzle dispersing device, which has a substantially higher efficiency (and/or higher energy density) than conventional high pressure homogenizers it is possible to achieve finely divided fat particles with a narrow particle size distribution already at comparatively much lower nozzle preliminary pressure. For example, emulsions of the same particle size distribution as are produced with a high pressure homogenizer at a preliminary pressure of 200 bars are already achieved at 50 bars homogenization pressure.

Finely divided dispersions may be produced particularly advantageously with the nozzle dispersing device according to the invention, in both continuous and discontinuous manner. Emulsions of defined particle size and narrow distribution may also be obtained. Emulsification takes place in a gentle manner because of the low energy outlay. The temperature increase which takes place in the process according to the invention is comparatively low compared to the temperature increase in known dispersing processes with high pressure homogenizers. This is of particular advantage to the processing of natural products such as milk and cream because thermal loads have a perceptible effect on the taste of such products.

The invention also provides the use of the nozzle dispersing device according to the invention for homogenizing fatty liquid natural products or foodstuffs, particularly for homogenizing milk, preferably from mammals or milk based on natural oils such as soya oil, wherein in the homogenized liquid up to 90% of the dispersed particles in the liquid have a volume-related particle diameter in the range from 0.1 to 1 µm, particularly from 0.3 to 1 µm.

The invention will be described in greater detail by way of example below, with the aid of the accompanying drawings, without limiting the particulars of the invention.

BRIEF DESCRIPTION OF THE INVENTION

The drawings show the following:

EXAMPLES

Example 1

The mode of operation of the process according to the invention is demonstrated using the example of the model emulsion paraffin oil (45 parts by weight) in water (50 parts by weight) with Tween 80/Arlacel 80, HLB 11.5 (5 parts by weight) as emulsifiers. The model emulsion was initially deliberately chosen in order to ensure the reproducibility of the results compared with a use of raw milk for example.

Figure 1:
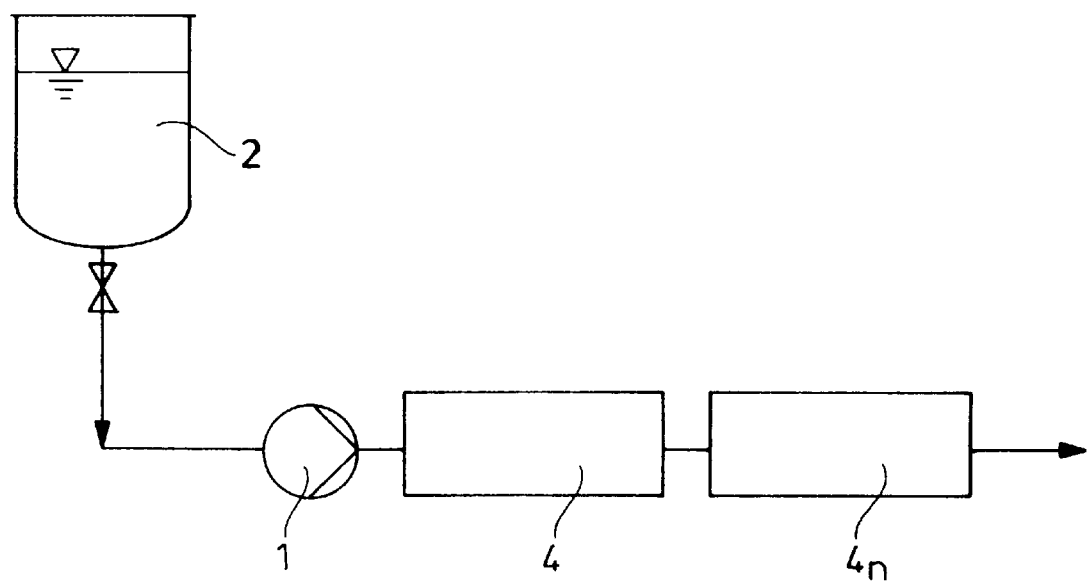
FIG. 1 shows the longitudinal section through a single-stage embodiment of the nozzle dispersing device according to the invention
Figure 2:
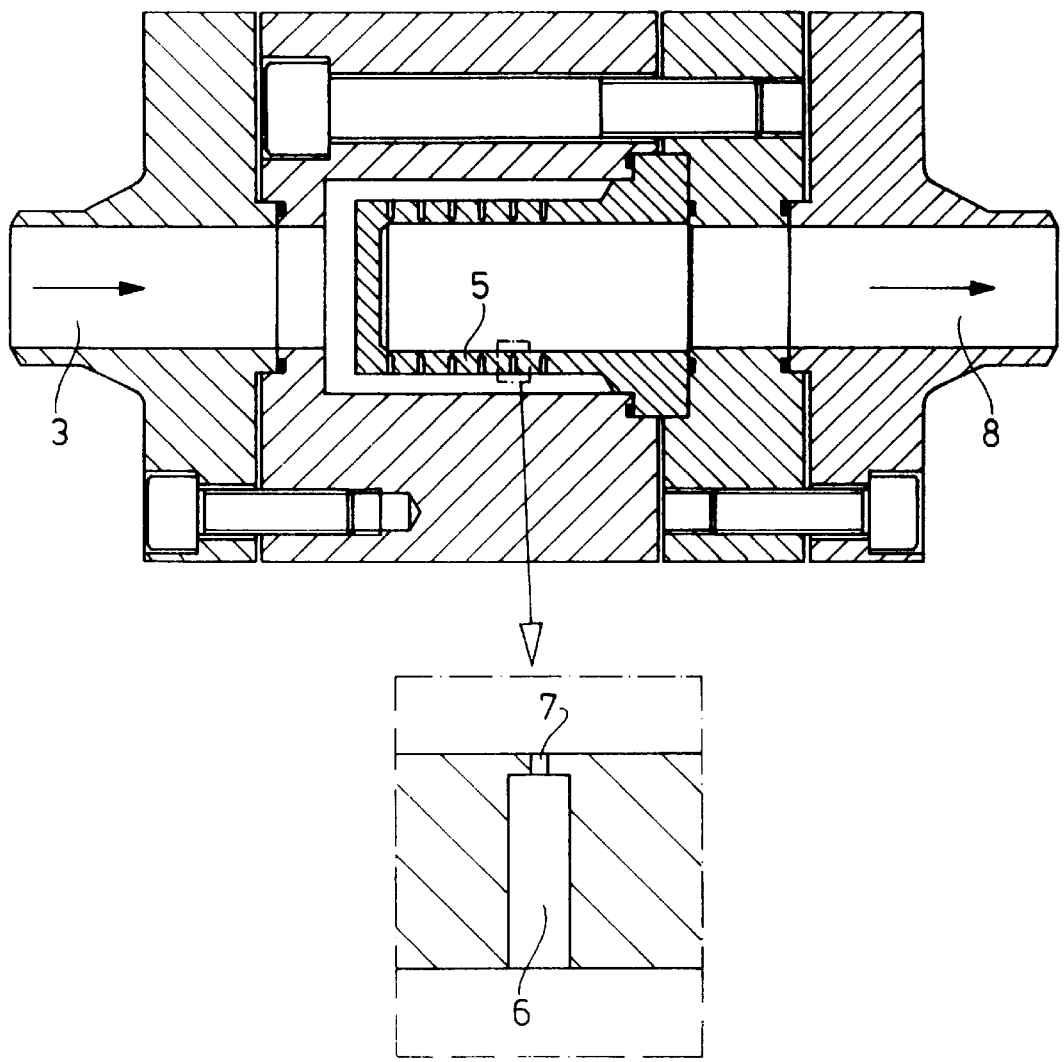
FIG. 2 shows a cross-section through the nozzle dispersing device corresponding to FIG. 1

A nozzle dispersing device according to FIG. 2 with a single-stage dispersing unit 4 was used. A three-stage reciprocating pump was used as conveying unit 1. The parallel-connected dispersing openings 6, 7 had bores 7 with a round cross-section with a diameter of 0.5 mm and a length of 0.75 mm.

Figure 3:
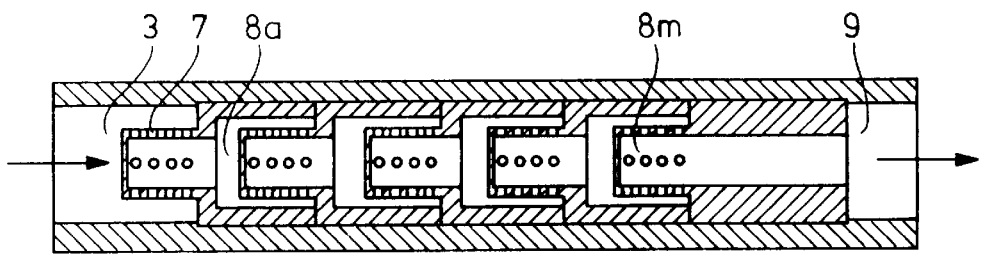
FIG. 3 shows the longitudinal section through a five-stage variant of the nozzle dispersing device according to the invention

FIG. 3 shows the longitudinal section through a five-stage variant of the nozzle dispersing unit according to the invention with the preliminary pressure chamber 3, the dispersing openings 7, the low pressure chambers 8*a* to 8*m* and the outlet 9. The pressure drop and/or homogenizing pressure is identical with the same number of dispersing openings 6, 7 and the same hydraulic diameter in each stage. Different pressures may be set in the stages by varying the number of the openings or the size of the hydraulic diameter.

Figure 4:
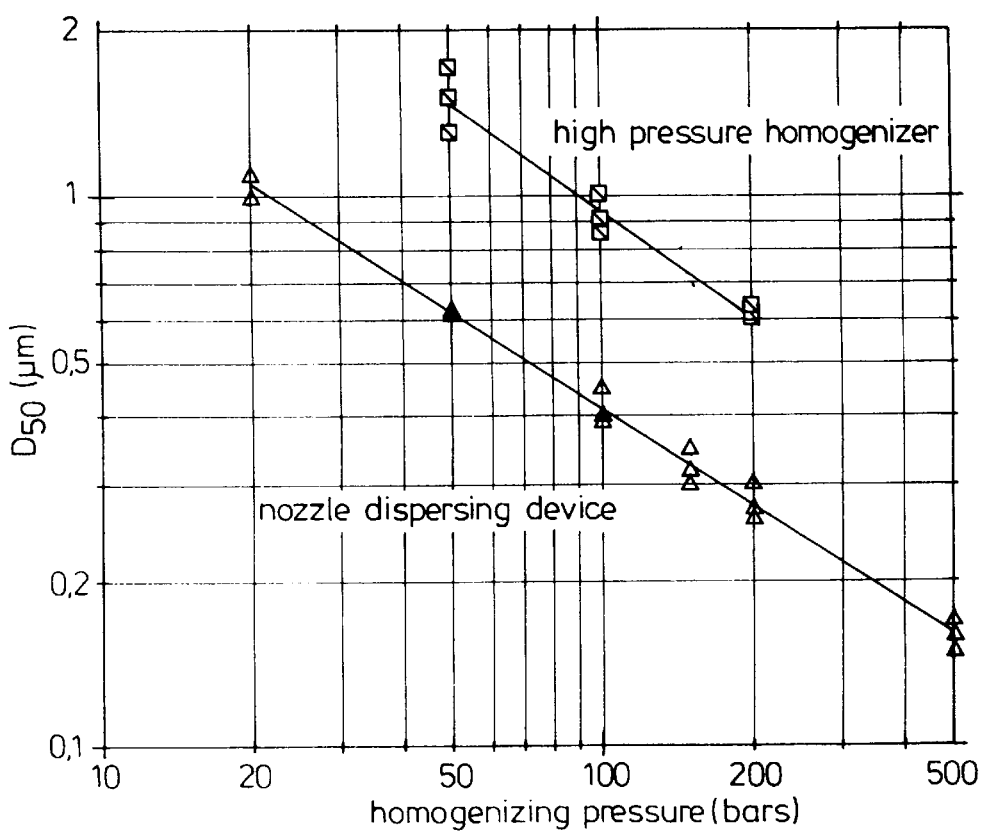
FIG. 4 shows a graph to explain the homogenizing properties of a nozzle dispersing device according to the invention compared with the characteristic curve of a known high pressure homogenizer using the example of a model emulsion.

FIG. 4 shows a graph to explain the homogenizing properties of the nozzle dispersing device according to the invention compared with the characteristic curve of a known high pressure homogenizer (cf. VDI Report, series 3, No. 136, p. 50, FIG. 3.4) using the example of a model emulsion. The graph shows that the same particle fineness that is obtained with the high pressure homogenizer at a pressure of 200 bars is obtained at only 50 bars with the device according to the invention.

200 bores were arranged in parallel in the dispersing unit according to FIG. 2, for example, for a throughput of 10 m³/hr and at a homogenization pressure of 50 bars. The problem of the larger aperture widths of high pressure homogenizing valves at higher throughput does not therefore arise. Furthermore, the multiple nozzles can be produced easily and inexpensively.

The temperature increase on homogenizing is distinctly reduced, e.g. 1.2° C. at 50 bars, with the low pressure homogenizing device instead of 4.8° C. at 200 bars homogenizing pressure in the known high pressure homogenizing valve.

Comparative Example 2 (conventional high pressure homogenizer)

Cow's milk adjusted to a fat content of 3.5% was homogenized using a high pressure homogenizer produced by "APV Homogeniser", Lubeck, at a temperature of 70° C. and a volumetric flow rate of 5 m³/h. The homogenizing valve was a typical 2-stage homogenizing valve for the homogenization of milk (cf. also FIG. 3.6 of Eibel, "Untersuchung zur Hochdruckhomogenisation"; Fortschr.-Ber. VDI series 3, No. 136, Düsseldorf, VDI Verlag 1987). The two-stage homogenizing valve was operated at a total pressure of 145 bars, the pressure being reduced by 10% in the 2nd stage. The pump employed in the high pressure homogenizer was a three-piston pump.

The increase in the temperature of the milk issuing from the homogenizer was 3.5° C.

The average particle size of the fat droplets in the milk, as measured by laser correlation spectroscopy, was 0.37 μm. No coarse particles of a diameter $d_{max}$ of >4 μm were detected under an optical microscope.

Comparative Example 3

Milk was homogenized unter the same process conditions as in comparative example 2, except that the pressure was lowered to a total pressure of 120 bars.

The increase in the temperature of the milk issuing from the homogenizer was 2.9° C. under the above conditions.

The particle size, as measured by laser correlation spectroscopy, was 0.38 μm. No coarse particles with a diameter $d_{max}$ of >4 μm were detected under the microscope.

On carrying out the process at an even lower total pressure coarsely divided nonstable emulsions were obtained, so that the abovementioned high operating pressures had to be used.

Example 4 (Process according the invention)

The two-stage high pressure homogenizing valve was removed from the homogenizing device used in comparative examples 2 and 3 and instead a jet disperser having a geometry corresponding to FIG. 2 and comprising 110 bores was inserted. The bores of the jet desperser each had a diameter of 0.5 mm and a length of 0.75 mm.

At a throughput of 5 m³/h through the three-piston pump of the homogenizer the momogenization pressure was 50 bars. The emulsifying temperature was also 70° C.

The increase in temperature of the milk issuing from the homogenizer was 1.1° C. under the above conditions.

The average particle size of the milk, as measured by laser correlation spectroscopy, was 0.37 μm. No coarse particles with a diameter $d_{max}$ of >4 μm were detected under the microscope.

Example 5 (according to the invention)

The same process conditions were used as in example 4, except that two jet dispersers having a geometry corresponding to FIG. 3 were arranged in succession. The first jet disperser had 120 bores, each having a diameter of 0.6 mm and a length of 0.9 mm. The second jet disperser had 120 bores, each with a diameter of 0.7 mm and a length of 1.05 mm.

At a throughput of 5 m³/h the total homogenizing pressure was 20 bars. The emulsifying temperature was also 70° C.

The increase in the temperature of the milk issuing from the homogenizer was only 0.5° C. under the above conditions.

The average particle size of the milk, as measured by laser correlation spectroscopy, was 0.38 μm. No coarse particles with a diameter $d_{max}$ of >4 μm were detected under the microscope.

A comparison of the examples according to the invention and the comparative examples shows that it is possible to obtain a comparatively high emulsifying quality of the milk under considerably less severe conditions (a lower increase in temperature) and a drastically lower homogenizing pressure. The reduction in the homogenizing pressure also corresponds to a reduction in the energy input by more than 50%. The operating costs for homogenization can thus be considerably reduced.

What is claimed is:

1. Single or multi-stage nozzle dispersing device for homogenizing fatty liquid natural products or foodstuffs consisting of a conveying unit (1) for conveying the liquid to be homogenized (2), a preliminary pressure chamber (3), one or more low pressure chambers connected in series (8*a* . . . 8*m*) and a plurality n of dispersing openings (6, 7) via which the preliminary pressure chamber (3) and the low pressure chambers (8*a* . . . 8*m*) are connected together, wherein the conveying unit (1) generates a defined preliminary pressure in the preliminary pressure chamber (3), wherein the nozzle bores (7) of the dispersing openings have a hydraulic diameter of 0.1 to 1 mm and are formed in such a way that the product of the hydraulic cross-sectional are $F_h$ of the nozzle bores (7) and their length L satisfies the equation $$F_h * L = d^3$$

in which d is the hydraulic diameter of the nozzle bores (7).

2. Nozzle dispersing device according to claim 1, wherein the nozzle bores (7) have a hydraulic diameter of 0.1 to 1 mm.

3. Device according to claim 1, wherein the conveying unit (1) generates a preliminary pressure of 100 bars maximum.

4. Device according to claim 1, wherein the number n of the nozzle bores (7) in a stage of the device is 50 or more.

5. Device according to claim 1, wherein the total cross-sectional area of all nozzle bores (7) in a stage is at least 10 $mm^2$.

\* \* \* \* \*